Figure 1:
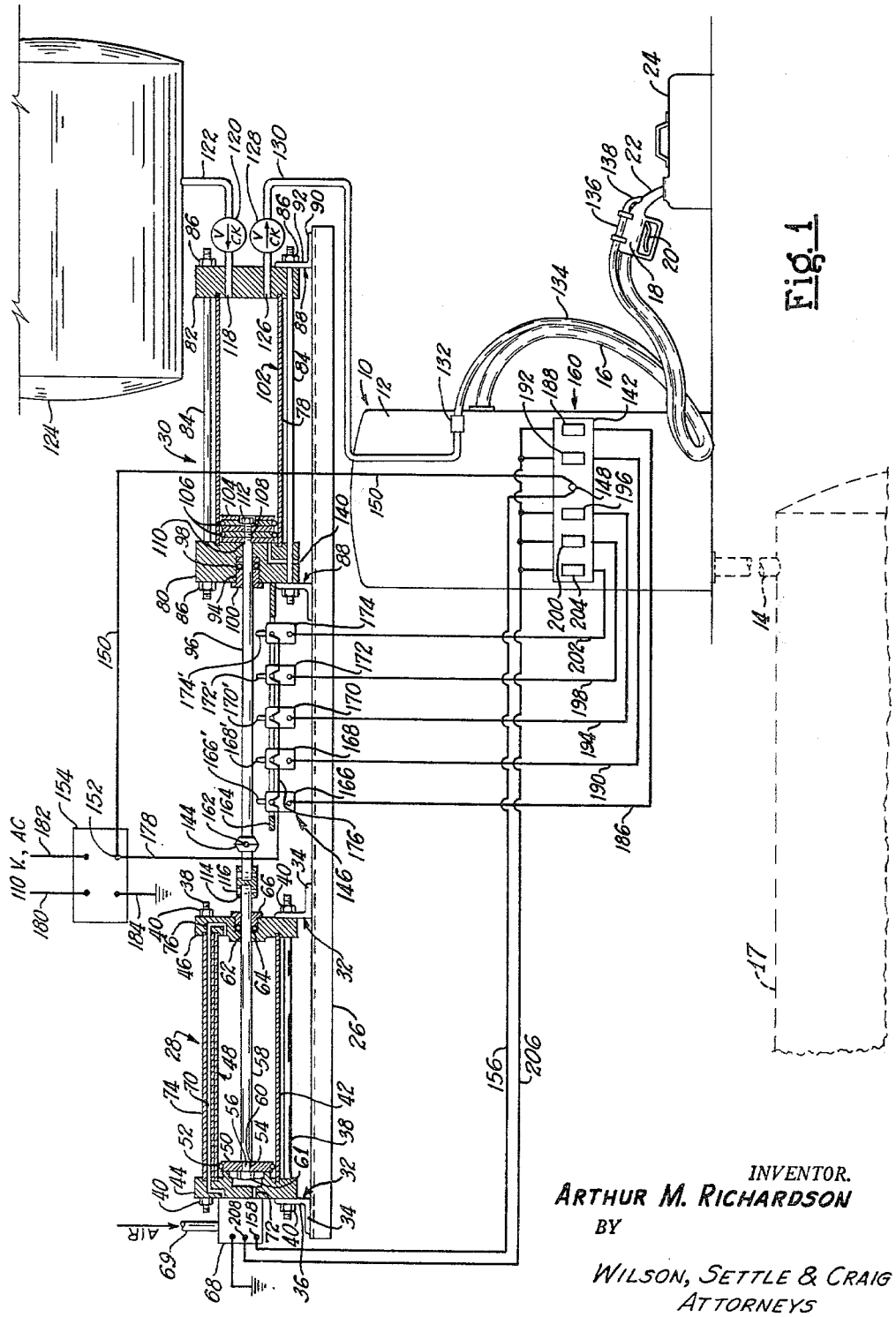

March 23, 1965   A. M. RICHARDSON   3,174,649
GASOLINE AND OIL BLENDER
Filed Oct. 12, 1961

INVENTOR.
ARTHUR M. RICHARDSON
BY
WILSON, SETTLE & CRAIG
ATTORNEYS

United States Patent Office 3,174,649
Patented Mar. 23, 1965

3,174,649
GASOLINE AND OIL BLENDER
Arthur M. Richardson, Rte. 3, Traverse City, Mich.
Filed Oct. 12, 1961, Ser. No. 144,644
3 Claims. (Cl. 222—76)

This invention relates to fluid despensing devices, and more particularly to fluid dispensing devices adapted to deliver selected quantities of fluid in accurately metered amounts.

In the operation of a two-cycle gasoline engine, such as utilized on outboard motor boats, power lawn mowers, and many other items, it is customary to mix lubricating oil with the fuel or gasoline to provide lubrication between the pistons and cylinder walls. However, not all engines utilize the same fuel mixture; thus, for example an outboard motor generally operates at a ratio of about one pint of oil to one gallon of gasoline and an automobile utilizing a two-cycle engine may require about one quart of oil per eight to ten gallons of gasoline.

Therefore, it is obvious that it would be desirable to provide a metering device associated with a gasoline pump wherein selected quantities of oil could first be placed in a container such as a gasoline tank of a vehicle and thereafter, an appropriate amount of gasoline added to provide the required mixture. Thus, a single gasoline pump would be adapted to supply a variety of oil-gasoline mixtures for servicing a variety of vehicles, providing custom blended fuel mixture.

Accordingly, if an improved and simplified fluid metering mechanism could be provided for attachment to a conventional gasoline pump that would dispense selected quantities of oil in an accurately metered manner for blending with a given quantity of gasoline, a substantial step forward in the art of fueling two-cycle engines would be provided. Also, it would provide a step forward in the art of dispensing fluids in general if a novel and simplified device could be provided for dispensing selected quantities of fluid in accurately metered amounts.

Accordingly, it is an important object of the present invention to provide a novel fluid dispensing and metering device.

Another object is to provide a novel fluid dispenser wherein selected quantities of a fluid are delivered in accurately metered amounts.

A still further object of the present invention is to provide an oil metering device for attachment to a conventional gasoline pump whereby selected quantities of oil in accurately metered amounts are first delivered to a fuel container with subsequent addition of gasoline by the pump to produce a desired mixture.

A still further object is to provide a novel fluid dispenser that incorporates a novel electrical control system to retain a delivery cylinder full of fluid and thus automatically prepared for repeated delivery.

Other objects of this invention will appear in the following description and appended claims, reference being had to the accompanying drawings forming a part of this specification, wherein like reference characters designate corresponding parts in the several views.

The single FIGURE 1 of the drawings is an elevational view of the dispensing unit of the present invention, with parts in section for clarity, showing the unit operably associated with a conventional gasoline dispensing pump.

The environment

The novel fluid dispensing device of the present invention, as shown in the drawings, is adapted to be associated with or connected to a conventional gasoline pump 10 such as used in automobile service stations, for dispensing fuel to automotive vehicles. Thus the pump 10 includes a housing 12 supported at ground level on a suitable foundation and encloses the various operating components including pumps, valves, meters and gauges for dispensing fuel. The gasoline pump 10 is connected by a fluid line 14 to an underground storage tank 17, from which it is adapted to withdraw and dispense fluid fuel.

The pump 10 also includes a delivery hose 16, having a valve 18 attached to the end thereof and the valve is adapted to be actuated by a manually movable handle 20. A nozzle 22 is connected to the end of the valve 18 for delivering fluid from the underground storage tank 17 via the pump 10 to a container 24.

It is to be noted that the container 24 is illustrated as a portable fuel tank for an outboard engine. However, it will be obvious that the container can take the form of any suitable fuel receptacle, such as the fuel tank of an automobile using a two-cycle engine, or other vehicle.

The invention

As shown in the upper portion of the single figure of the drawings, the fluid dispensing device of the present invention includes a base 26, suitably made of angle iron. On the left end of the base 26, there is mounted an air cylinder 28 and at the right end there is mounted an oil metering cylinder 30.

The air cylinder 28 is provided at each of its ends with brackets 32, suitably of identical configuration, that are made in the form of angles with the bottom legs 34 connected to the base 26 as by bolts or other suitable fastening devices (not shown). The inner surfaces of the vertical legs 36 of the brackets 32 abut the cylinder heads 44 and 46 of the air cylinder 28 and a rod 38, having threaded ends, is passed through aligned apertures formed in the vertical legs 36 and in the cylinder heads whereby nuts 40 can be applied for mounting the unit in assembled relationship.

The air cylinder 28 includes a tubular body 42 and the cylinder heads 44 and 46 are attached to the ends by a plurality of tie rods 38 spaced around the periphery of the unit and retained by nuts 40. Within the bore 48 of the air cylinder 28, a piston 50 is provided for reciprocating movement therein and is sealed with respect to the bore by an O-ring 52 or equivalent sealing device such as a piston ring or the like. The piston 50 is provided centrally with an aperture 54 and the reduced portion 56 of a piston rod 58 is passed therethrough, being threaded on the terminal end for receiving a nut 61 whereby the connection is made with the piston rod. Between the reduced portion 56 and the body of the piston rod 58 there is formed a shoulder 60 against which the piston 50 abuts, being held firmly by the nut 61. The cylinder head 46 is provided centrally with an aperture 62 through which the piston rod 58 extends and an O-ring 64 is fitted into a suitable recess in the head, being retained by a threaded nut 66 to provide a gas-tight seal around the piston rod 58.

The left-hand cylinder head 44 of the air cylinder 28 is fitted with a two-way solenoid air valve 68. Also, the left-hand cylinder head 44 is provided with first and second air passages 70 and 72 whereby air can be selectively directed to each side of the piston 50. These passages 70 and 72 are, of course, aligned with corresponding passages in the solenoid air valve 68.

The passage 70 leads up to a point adjacent the periphery of the cylinder head 44 and joins with an elongated tube 74 that extends between the cylinder heads 44 and 46 and at its right end mates with a passage 76 of generally U-shaped configuration that doubles back to place air on the right side of the piston 50. The opening 72 leads directly through the cylinder head 44 to put air on the left side of the piston 50. Thus, by selectively directing air into the air cylinder 28, the piston can be moved in either direction as required.

The oil cylinder 30 includes a tubular or cylindrical body 78, having a left-hand cylinder head 80 and a right-hand cylinder head 82 attached thereto. A plurality of tie rods 84 having threaded ends for receiving nuts 86 are passed through aligned apertures in the respective left and right cylinder heads 80 and 82 and the nuts 86 are applied to retain the components of the unit in assembled relationship.

The oil cylinder 30 is mounted on the base 26 in a manner similar to the mounting of the air cylinder 28 and such mounting includes a pair of brackets 88 whose horizontal legs 90 are secured to the base 26 as by bolting or the like, not shown. The vertical legs 92 are apertured and fitted over the ends of the lower tie rod 84 and the nuts 86 applied to retain them in position.

The left-hand cylinder head 80 of the oil metering cylinder 30 is provided centrally with a counterbored aperture 94, receiving a piston rod 96, and an O-ring 98 and nut 100 are applied to the counterbore to provide a seal. Within the bore 102 of oil metering cylinder 30, there is fitted a piston 104, suitably provided with a pair of O-rings 106 to provide a seal with the bore 102. The piston is provided centrally with an aperture whereby it is fitted over a reduced threaded terminal portion 108 of piston rod 96 in abutting relationship with a shoulder 110, and is secured by a nut 112.

It will be noted that piston rod 58 of the air cylinder 28 and the piston rod 96 of the oil metering cylinder 30 are in axial alignment and have their free ends joined by a sleeve connector 114 having tapered pins 116 passed transversely through the ends thereof and through mating apertures in the ends of the respective piston rods. Thus, movement of the piston rod 58 of the air cylinder 28 is adapted to move the piston rod 96 and drive the piston 104 of the oil cylinder 30 in a to-and-fro manner for fluid dispensing purpose to be hereinafter described.

Reference to the right-hand end of the oil cylinder 30 will show that the right-hand cylinder head 82 is provided with an inlet aperture 118 to which a check valve 120 is connected and the check valve 120 connected by a fluid line 122 to an oil storage tank 124. The cylinder head 82 of the oil metering cylinder 30 is also provided with an aperture 126 to which a check valve 128 is connected and the check valve is connected by a fluid line 130, leading to the gasoline pump 10. The line 130 terminates in a coupling 132 for connection with a flexible hose 134 that is secured along the gasoline delivery hose 16 and extends to a check valve 136 connected to the gasoline flow valve 18 with a delivery tube 138 leading into the nozzle 22 for dispensing oil into the container 24, backflow being prevented.

The left-hand cylinder head 80 of oil metering cylinder 30 is provided with an atmospheric vent passage 140 to permit free movement of the piston 104.

From the foregoing it will be observed that when the piston 104 of the oil metering cylinder 30 is moved to the left, oil from storage tank 104 will be drawn by line 122 through check valve 120, inlet aperture 118, and into the bore 102 of the oil metering cylinder. Then, when the piston 104 is reversed and moved to the right, the oil within the bore 102 will be forced through the outlet aperture 126, check valve 128, fluid line 130, fitting 132, flexible hose 134, check valve 136, and delivery tube 138 through nozzle 22 into the container 24. The control apparatus by which selected amounts of oil are metered in an accurate manner will now be described.

The control system

Briefly, the control system includes a switch panel 142, mounted on gasoline pump 10, an operating cam 144 mounted on the piston rod 96 of oil metering cylinder 30; and a plurality of contact switches 146 positioned to be actuated by the operating cam 144. These units are electrically connected, as will be hereinafter described, to control the operation of the air and oil cylinders 28 and 30 for delivering selected quantities of oil from the oil metering cylinder 30 in accurately metered amounts.

The switch panel 142 includes a start button 148 that has an electrical feed line 150 connected thereto and extending to the output tap 152 of a transformer 154. The start button 148 is also conected by means of a line 156, that leads to a terminal 158 of the valve 68. When this button is pushed, the valve is actuated to direct air through the air passage 72 of the air cylinder 28 to move the piston 50 thereof to the right, causing the oil cylinder 30 to deliver oil as previously described.

Selected quantities of oil are determined by the operating cam 144 and the contact switches 146 working through selector switches 160 of the switch panel 142. The operating cam 144 is slip fitted on the piston rod 96 of the oil metering cylinder 30 and is retained in adjusted position by means of a set screw 162. In this regard it will be understood that the piston rod 96 can be threaded and the operating cam 144 also threaded and provided with a lock nut for setting of adjustment.

Attached in aligned relationship with the piston rod 96 is a mounting bracket 164 to which are mounted spaced contact switches 166, 168, 170, 172 and 174. The contact switches are wired in parallel, being connected by a common line 176 that joins with a feed line 178 also leading to the output tap 152 of transformer 154. It might be mentioned at this point that the transformer 154 is provided with input lines 180 and 182 and a ground 184 to valve 68. Each of the contact switches of the group 146 is connected to a separate selector switch of the group 160 at the pump panel 142. Thus, the contact switch 166 is connected by line 186 to selector switch 188; similarly, contact switch 168 is connected by line 190 to the selector switch 192. Likewise, contact switch 170 is connected by line 194 to selector switch 196; contact switch 172 by line 198 to selector switch 200; and contact switch 174 by line 202 to selector switch 204. The opposite sides of the selector switches 188, 192, 196, 200 and 204 are connected in parallel to a line 206 leading to the valve 68 and connecting with a terminal 208 thereof.

Operation of the device

As previously mentioned, when the start button 148 is pushed, current flows from the transformer 154 by line 150 through the start button and line 156 to the valve 68, which directs air through the passage 72, forcing the piston 60 to the right. This action by the connection 114 moves the piston rod 96 of oil metering cylinder 30 to the right to dispense oil as hereinbefore described, and causes the operating cam 144 to successively engage the actuating buttons 166′, 168′, 170′, 172′ and 174′ of contact switches 166, 168, 170, 172 and 174, and any one of these switches can be set to stop and reverse the operation. Thus, for example, presuming that the selector switch 188 on the gasoline pump 10 is set, and the operating cam 144 strikes the actuator button 166′ of the first contact switch 166, this completes a circuit from the tap 152 of the transformer 154 through line 178, switch 166, line 186, selector switch 188 and line 206 to the terminal 208 of valve 68 to admit air through passage 70 to the right side of piston 50 to force the piston to the left. The position of switch 166 is calibrated to cause, for example, one pint of oil to be expelled from the oil cylinder 30. Similarly, the remaining contact switches 168, 170, 172 and 174 are positioned to deliver incremental pints of oil by the cylinder 30.

In summary, operation of the device involves the following steps after the gasoline delivery nozzle 22 is positioned to deliver to the container 24.

(1) Set desired selector switch of group 160 for amount of oil to be delivered;

(2) Push start switch or button 148.

When the start switch 146 is pushed, the air cylinder 28 is actuated to move the piston 104 of the oil cylinder 30 to the right and deliver oil. When the operating cam 144 strikes the actuator button of the contact switch connected with the selector switch which has been set, the air cylinder 28 is reversed, stopping delivery and refilling the cylinder for a subsequent delivery. Thereafter, gasoline is fed from the pump 10 into the container 24 to complete the fuel mixture.

*Extended scope of invention*

Although the fluid delivery device of the present invention has been described with reference to a conventional gasoline pump, it will be obvious that the device is adapted to separate use in a wide variety of fluid delivery applications and such are to be considered within the scope of the invention.

Also, it is to be considered within the broad scope of the invention to substitute another type of motor for the air cylinder 28 that is adapted to be reversed as by electrical or fluid control.

The transformer unit 154 utilized in the device of the present invention is adapted to convert 110 volt alternating current to approximately 8 volts, inasmuch as the solenoid valve utilized was of such rating. However, it is to be included within the broad scope of the invention to utilize higher voltage valves and appropriate control components.

Although an electrical system has been described in the foregoing specific embodiment of the invention, a gas or fluid control system also can be utilized. Thus, the transformer 154 could be replaced by a reservoir of compressed fluid and valves substituted for selector switches 188, 192, 196, 200 and 204, and for contact switches 166, 168, 170, 172 and 174. Also a fluid actuated valve would be used at 68.

Also, the actuating cam 144 could be placed on the exposed portion of the piston rod 58 of the air cylinder 28.

*Advantages of the present invention*

The present invention is characterized by simplicity of operation and accurate metering of fluids in selected amounts and automatically resets itself for a subsequent delivery.

Also, in the event a selector switch is not actuated, no harm will be done after a full delivery from the oil filter 30 is provided. In this situation, the piston 50 of the air cylinder 28 will merely move the full length of the cylinder and stop by abutting the right-hand cylinder head 46. In this regard, it will be noted that the selector switches are of the type wherein when one is depressed another or all of the others are returned to inactive positions and by this arrangement one of the switches will always be depressed so that the operating cam 144 will actuate a circuit to reverse the air cylinder before full delivery of the oil cylinder is accidentally effected.

I claim:

1. In a fluid dispensing device, a base, an air cylinder mounted on said base, said air cylinder having a piston and an exposed piston rod connected thereto, an air line, a two-way solenoid valve operably connected between said air line and said cylinder and adapted to admit air selectively to each end of said cylinder to move said piston and extend and retract said piston rod thereof, a fluid delivery cylinder mounted on said base, said fluid delivery cylinder having a piston and an exposed piston rod, said piston rod of said air cylinder and said piston rod of said fluid delivery cylinder being axially aligned and having their free ends operably connected, said fluid delivery cylinder having a fluid inlet conduit and a fluid outlet conduit with check valves therein, a cam on said piston rod of said fluid delivery cylinder, a contact switch having an actuator button engageable with said cam on movement of said piston rod of said fluid delivery cylinder, means electrically connecting said contact switch with said two-way valve to reverse said air cylinder, and separate means electrically connected to said two-way valve to actuate said air cylinder in a forward direction, whereby actuation of said valve is effective to extend said piston rod of said air cylinder and retract said piston rod of said fluid delivery cylinder to force fluid from said fluid delivery cylinder and engagement of said cam with said actuator button of said contact switch is effective to reverse said air cylinder, stop fluid delivery by said fluid delivery cylinder and refill said fluid delivery cylinder.

2. In a fluid dispensing device, electrically operable means including a rod adapted to be movable forward and in a reverse direction thereby, a fluid delivery device operably connected to said rod, contact means carried by said rod, a plurality of switches positioned in successively engageable relation to said contact means upon movement of said rod, circuit connections between said switches and said electrically operable means, a closed selector switch connected in circuit with one of said switches, means for energizing said electrically operable means to move said rod in a forward direction until said contact means engages the switch in circuit with said selector switch, said forward movement of said rod actuates said fluid dispensing device to force fluid therefrom and said engagement of said contact means with said switch in circuit with said selector switch completes a circuit to said electrically operable means to reverse the movement of said rod to stop fluid delivery by said fluid delivery device.

3. In a fluid dispensing device, an air cylinder, said air cylinder having a piston and an exposed piston rod connected thereto, an air line, said air cylinder having an air passage leading to one side of the piston and a second air passage leading to the opposite side of the piston, electrically operable means operably connected between said air line and said cylinder air passages and adapted to admit air selectively to said air passages to move said piston and extend and retract said piston rod thereof, a fluid delivery cylinder, said fluid delivery cylinder having a piston and an exposed piston rod, said piston rod of said air cylinder and said piston rod of said fluid delivery cylinder being axially aligned and having their free ends operably connected, said fluid delivery cylinder having in one end thereof a fluid inlet conduit and a fluid outlet conduit with check valves therein, an abutment on one of said piston rods, a plurality of contact switches having actuator buttons positioned in successively engageable relation to said abutment upon movement of said piston rods, circuit connections between said contact switches and said electrically operable means, separate selector switches connected in said circuit connections for each contact switch with one of said selector switches being closed, means electrically connected to said electrically operable means to cause air to flow in one of said air passages on one side of said piston to actuate said air cylinder piston, abutment and fluid cylinder piston in a forward direction until said abutment engages the button of the contact switch in circuit with said closed selector switch, said forward movement of said fluid cylinder piston forcing fluid from said fluid delivery cylinder and said engagement of said abutment with said button of said contact switch in circuit with said closed selector switch to complete the circuit to said electrically operable means to cause the movement of said pistons to reverse in direction by causing air to flow through the second air cylinder air passage on the opposite side of said air cylinder piston to thus stop fluid delivery of a measured quantity of fluid by said fluid delivery cylinder and refill said fluid delivery cylinder.

References Cited in the file of this patent

UNITED STATES PATENTS

| | | |
|---|---|---|
| 968,263 | Quinn | Aug. 23, 1910 |
| 2,553,788 | Richardson et al. | May 22, 1951 |
| 2,604,230 | Payne | July 22, 1952 |
| 2,631,437 | Bruce et al. | Mar. 17, 1953 |
| 2,673,012 | Harrington | Mar. 23, 1954 |
| 3,037,674 | Brady | June 5, 1962 |